(12) United States Patent
Partani et al.

(10) Patent No.: US 9,727,520 B2
(45) Date of Patent: *Aug. 8, 2017

(54) SYSTEMS WITH VIRTUAL UNIVERSAL ASYNCHRONOUS RECEIVER TRANSMITTER AND METHODS THEREFOR

(71) Applicant: ASPEED TECHNOLOGY INC., Hsinchu (TW)

(72) Inventors: Dwarka Partani, San Jose, CA (US); Sujith Arramreddy, San Jose, CA (US); Melanie Fike, Austin, TX (US)

(73) Assignee: ASPEED TECHNOLOGY INC. (TW)

( * ) Notice: Subject to any disclaimer, the term of this patent is extended or adjusted under 35 U.S.C. 154(b) by 439 days.

This patent is subject to a terminal disclaimer.

(21) Appl. No.: 14/338,570

(22) Filed: Jul. 23, 2014

(65) Prior Publication Data

US 2016/0028804 A1    Jan. 28, 2016

(51) Int. Cl.
 *G06F 15/16* (2006.01)
 *G06F 13/42* (2006.01)
(52) U.S. Cl.
 CPC ...... *G06F 13/4295* (2013.01); *Y02B 60/1228* (2013.01); *Y02B 60/1235* (2013.01)
(58) Field of Classification Search
 CPC .......................... G06F 13/4295; H04L 67/1095

USPC .................................................. 709/248, 223
See application file for complete search history.

(56) References Cited

U.S. PATENT DOCUMENTS

| | | | |
|---|---|---|---|
| 8,838,856 B2 * | 9/2014 | Partani | H04L 41/04 710/62 |
| 2007/0055793 A1 * | 3/2007 | Huang | G06F 13/102 710/8 |

* cited by examiner

*Primary Examiner* — Philip B Tran
(74) *Attorney, Agent, or Firm* — Sheridan Ross P.C.

(57) ABSTRACT

In one embodiment, a monolithic integrated circuit includes a first UART, a second UART, and a multiplexer. The first UART has a parallel IO interface to couple to a host system to transceive parallel data and a serial IO interface. The second UART has a parallel IO interface and a serial IO interface coupled to the serial IO interface of the first UART. The first and second UARTs convert parallel data into serial data and serial data into parallel data. The multiplexer has an output coupled to the serial input of the first UART, a first input coupled to the serial output of the second UART, a second input coupled to a serial input of a serial communication port, and a select input coupled to a control signal selectively coupling serial interfaces of first and second UARTs together for remote terminal services at a remote computer system over a network.

14 Claims, 9 Drawing Sheets

SYSTEMS WITH VIRTUAL UNIVERSAL ASYNCHRONOUS RECEIVER TRANSMITTER AND METHODS THEREFOR

CROSS-REFERENCE TO RELATED APPLICATIONS

This United States (U.S.) patent application claims the benefit of U.S. non-provisional patent application Ser. No. 12/031,032 entitled VIRTUAL UNIVERSAL ASYNCHRONOUS RECEIVER TRANSMITTER FOR SERVER SYSTEMS filed on Feb. 14, 2008 by inventors Dwarka Partani et al. U.S. non-provisional patent application Ser. No. 12/031,032 claims the benefit of U.S. provisional patent application No. 60/890,405 entitled INTEGRATED MANAGEMENT, GRAPHICS AND I/O CONTROL FOR SERVER SYSTEMS filed on Feb. 16, 2007 by inventors Dwarka Partani et al. and U.S. provisional patent application No. 60/892,441 entitled VIRTUAL UNIVERSAL ASYNCHRONOUS RECEIVER TRANSMITTER FOR SERVER SYSTEMS filed on Mar. 1, 2007 by inventors Dwarka Partani et al.

FIELD

The embodiments of the invention relate generally to computer server systems. More particularly, the embodiments of the invention relate to communication channels between a computer server and computer system over a communication port.

BACKGROUND

Oftentimes a local computer terminal is coupled to a serial communication ("COM") port of a computer server system to locally monitor and control the server system. A local computer terminal is typically a dumb terminal and has no operating system software of its own to execute other applications. As a result, the local computer terminal tends to be less expensive than a computer system. Note however that a computer system may be used to act as a computer terminal by executing a terminal software application. The local computer terminal typically communicates serially with a host using RS232 transceivers, an RS232 cable, and a pair of universal asynchronous receiver transmitters (UARTS).

The information communicated between a host computer and the local computer terminal is text without any graphics. That is, the local computer terminal provides a text user interface and not a graphical user interface. Moreover, information is communicated serially between the host computer and the local computer terminal and not in parallel. Moreover, the rate at which data is serially transmitted between them, a baud rate, can vary. When the baud rate is adjusted, it somehow must be communicated from one UART to another so that it may adapt to a new serial communication rate.

It is desirable to allow for remote management of a server system at a remote computer system when a local computer terminal is set up to be used to provide for local management of the server system. Remote management of a server system may lower the cost of operating, administering, and maintaining the server system.

BRIEF SUMMARY

The embodiments of the invention are summarized by the claims that follow below.

DETAILED DESCRIPTION

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Introduction

The embodiments of the invention include a method, apparatus and system for virtual universal asynchronous receiver transmitter for server systems.

In one embodiment of the invention, a monolithic integrated circuit includes a first universal asynchronous receiver transmitter (UART), a second UART, and a multiplexer. The first universal asynchronous receiver transmitter (UART) has a first parallel input/output interface to couple to a host system to receive and transmit parallel data and a first serial input/output interface. The first UART to convert parallel input data into serial output data and to convert serial input data into parallel output data. The second universal asynchronous receiver transmitter (UART) has a second parallel input/output interface and a second serial input/output interface to couple to the first serial input/output interface of the first UART. The second UART converts parallel input data into serial output data and to covert serial input data into parallel output data. The multiplexer has an output coupled to the serial input of the first UART, a first input coupled to the serial output of the second UART, a second input to couple to a serial input of a serial communication port, and a select input coupled to a virtual UART control signal. The virtual UART control signal selectively couples the serial interfaces of the first UART and the second UART together to provide remote terminal services at a remote computer system over a network.

In another embodiment of the invention, a method of providing remote terminal services over a network is provided. The method in a monolithic integrated circuit includes selectively decoupling a serial input of a serial communication port of a server from a serial input of a first universal asynchronous receiver transmitter (UART); selectively coupling the serial input of the first UART to the serial output of a second UART to provide remote terminal services at a remote computer system over a network; synchronizing a serial communication data rate of the second UART to a serial communication data rate of the first UART; and serially communicating data between the first UART and the second UART in response to the synchronized serial communication data rate.

In yet another embodiment of the invention, a system with local and remote server management is disclosed including a server having a printed circuit board with a network interface controller, a serial communication port, an integrated intelligent server management chip coupled to the network interface controller, a remote computer system coupled to the network interface controller through a local or wide area network, and a local computer system coupled to the serial communication port of the server. The network interface controller to couple the server to a network for remote client access and remote management and control of the server. The serial communication port to couple to a local computer system for local management and control of the server. The integrated intelligent server management chip to provide local and remote management and control of the server. The integrated intelligent server management chip includes first universal asynchronous receiver transmitter (UART) to couple to a host, a second virtual UART to couple to a remote computer system, a serial input/output interface to couple to the serial communication port, and a selective serial communication connection coupled between the first UART, the second virtual UART, and the serial input/output interface. The remote computer system includes a remote display, a remote keyboard, and a remote mouse to remotely manage and control the server. The local computer system includes a local display, a local keyboard, and a local mouse to locally manage and control the server.

Server Farm with Server Management

Figure 1:
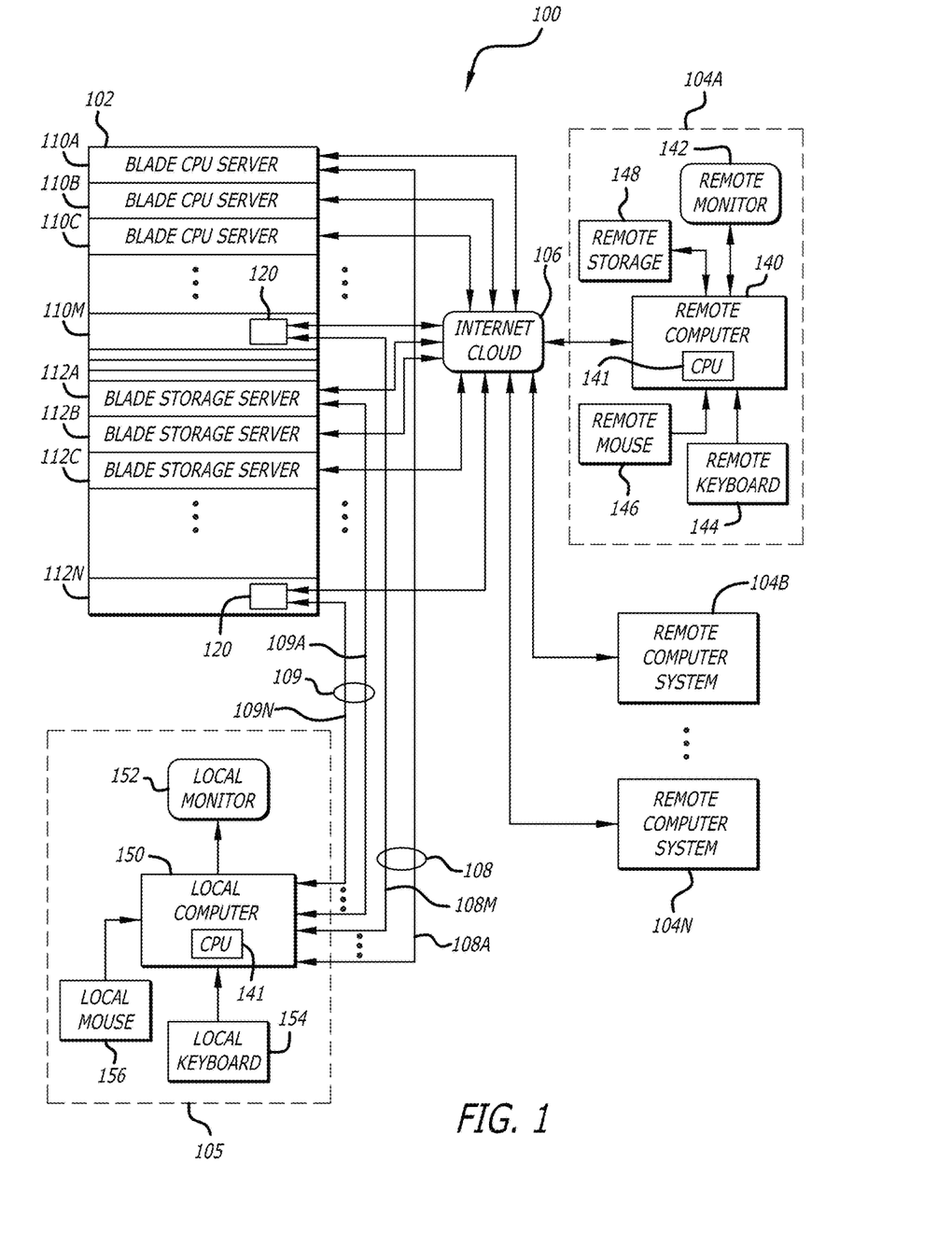
FIG. 1 is a block diagram of a server farm system with local/remote server management in accordance with one embodiment of the invention.

Referring now to FIG. 1, a server farm system 100 is illustrated with local and remote server management in accordance with one embodiment of the invention. The server farm system 100 includes a server farm 102, one or more remote computer systems 104A-104N at remote locations coupled to the server farm 102 via a local area network (LAN) or a wide area network (WAN) 106, such as the internet, and a local computer system 105 coupled to the server farm 102 via a local communication connection 108,109. The local communication connection 108,109 to the server farm 102 may be a local area network connection (LAN) or a serial communication connection, such as RS232 or universal serial bus (USB).

The server farm 102 may include a plurality of central processing unit (CPU) servers 110A-110M and a plurality of storage servers 112A-112N, each including one or more integrated management, graphics, input/output local/remote controller chips 120. The integrated management, graphics, input/output local/remote controller chip 120 may also be referred to as an integrated intelligent global server management chip. The plurality of central processing unit servers 110A-110M and the plurality of storage servers 112A-112N when having a form factor for mounting into a rack may be referred to as blade CPU servers and blade storage servers, respectively. Collectively, the plurality of central processing unit (CPU) servers 110A-110M and the plurality of storage servers 112A-112N may be simply referred to as a server.

The one or more remote computer systems 104A-104N may each include a remote computer 140 with a CPU 141, a remote monitor 142, a remote keyboard 144, a remote mouse 146, and a remote storage device 148 coupled together as shown. The one or more remote computer systems 104A-104N may be considered to be remote clients to the servers as part of a client-server system. Moreover, one or more of the remote computer systems 104A-104N may be used to provide remote management and control of the servers in the server farm. Server management client software may be executed on one or more of the remote computer systems in order to remotely manage and control the servers in the server farm. Additionally, web browser software may be used to executed by the one or more of the remote computer systems in order to gain access to a web site provided by the integrated intelligent global server management chip 120 and remotely manage and control the servers in the server farm.

The local computer system 105 is co-located with the server farm 102 to locally perform server management. That is, the local computer system 105 is located in the same room as the server farm 102. In contrast, the one or more remote computer systems 104A-104N are at remote locations to remotely perform server management. That is, the one or more remote computer systems 104A-104N are in at least a different room in the same building or otherwise in a different building, city, state, or country than the server farm 102.

Figure 2:
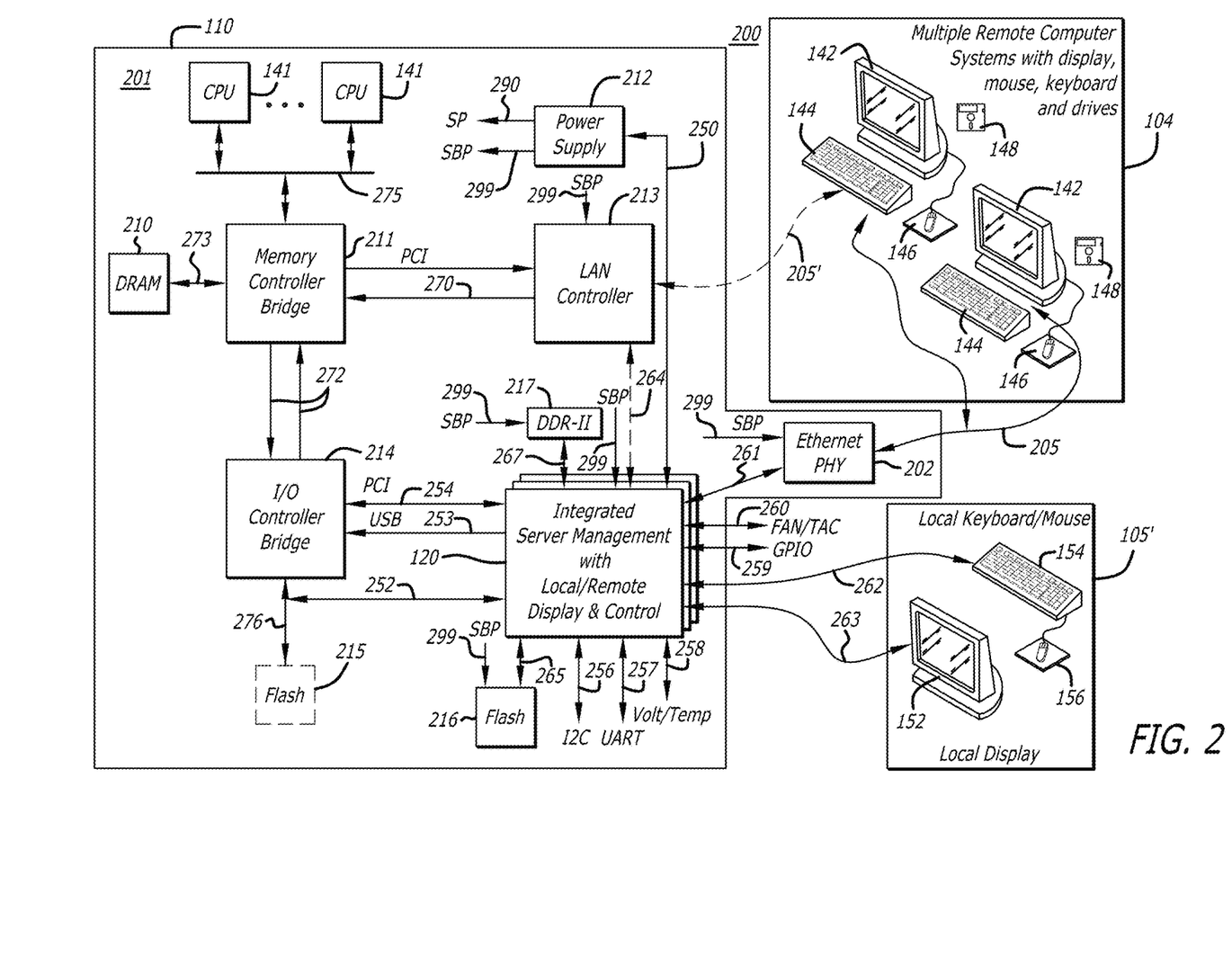
FIG. 2 is a block diagram of a local/remote server management system in accordance with another embodiment of the invention.

The local computer system 105 may include a local computer 150 with a CPU 141, a local monitor 152, a local keyboard 154, and a local mouse 156 coupled together as shown. In one embodiment of the invention, the local computer system 105 does not include the local computer 150 so that the local monitor 152 couples to a graphics controller in the chip 120 of one of the servers 110,112 and the local keyboard 154 and the local mouse 156 couple to an I/O controller in the chip 120. FIG. 2 illustrates a local keyboard/mouse/display system 105', absent the computer 150 and CPU 141, coupled to an integrated management, graphics, input/output local/remote controller chip 120.

Local server management involves provide server management services in the same room as the server farm 102 with the local computer system. In contrast, remote server management involves providing server management services at a remote location via remote keyboard, video, mouse, & storage (KVMS) at a remote computer system in one embodiment of the invention. Generally, server management services may include monitoring, controlling, maintaining, upgrading, failure resolution, downtime prevention, availability, and performance reporting of the server farm, its servers and the components within each server. The integrated management, graphics, input/output local/remote controller chip 120 facilitates remote server management as well as local server management.

Server Management System

Referring now to FIG. 2, a local/remote server management system 200 is illustrated including a server system 110, one or more remote computer systems 104, and a local keyboard/mouse/display system 105' coupled together as shown. The one or more remote computer systems 104 couple to the server system 110 via a wide area network connection 205. The local keyboard/mouse/display system 105' couples to the server system 110 by one or more serial communication links 262-263, such as RS232, a PS/2, or universal serial bus (USB); a serial over local area network (SOL) communication link, and/or by a direct monitor cable carrying analog/digital red-green-blue (RGB) signals.

The server system 110 includes a printed circuit board 201 with a number of integrated circuits mounted thereto, including one or more integrated management, graphics, input/output local/remote controller chips 120 for one or more processors (CPU) 141, respectively. The server system 110 may include the one or more integrated management, graphics, input/output local/remote controller chips 120; the one or more processors (CPU) 141, scratch pad memory DRAM 210, a memory controller 211, a power supply 212, a local area network interface controller (NIC) 213, a physical network interface device 202, an input/output controller 214, an optional non-volatile flash memory 215, a non-volatile flash memory 216, and a frame buffer memory 217 coupled together as shown in FIG. 2. A number of busses 252-254, 270, 272, 273, 275, 276 may be further used to couple elements of the server system 110 together as shown.

The power supply 212 generates a system power (SP) 290 that is provided to a substantial portion of the server system 110 and a standby power (SBP) 299 that is coupled to the one or more integrated management, graphics, input/output local/remote controller chips 120; the network interface controller 213, the non-volatile flash memory 216; the frame buffer memory 217; and a physical network interface device 202. The system power 290 may be switched on and off by the power supply 212 in response to a power supply (PS) control signal 250. The standby power 299 is generated provided that AC power is provided to the power supply 212. The power supply control signal 250 is generated by an integrated management, graphics, input/output local/remote controller chip 120. A power supply control signal 250 may be generated by each of the integrated management, graphics, input/output local/remote controller chips 120 and the power supply 212 may generate more than one system power that is coupled respectively to the one or more processors 141. In this manner, each processor 141 may be selectively powered down and powered back up by a respective power supply control signal 250. While the processors 141 and other elements of the server system may be selectively powered off, the standby power (SBP) 299 coupled to the one or more integrated management, graphics, input/output local/remote controller chips 120; the network interface controller 213, the non-volatile flash memory 216; the frame buffer memory 217; and a physical network interface device 202 keeps them powered up during such periods.

The flash memory 216 coupled to the one or more integrated management, graphics, input/output local/remote controller chips 120 may store software programs for execution by each. In particular, the flash memory 216 stores the basic input/output system (BIOS) software that is used to initialize the chip 120 and other hardware elements of the server 110. The BIOS also controls the boot process of the server 110 and provides low-level input/output routines to modify details of the system's hardware configuration. The contents of the flash memory 216 can be remotely managed to upgrade or program the firmware that is used by the integrated management, graphics, input/output local/remote controller chip 120 and/or to upgrade or program the firmware that is used by the server 110.

The frame buffer memory 217 coupled to the chips 120 is a random access memory for storage of frames of video or graphics display data that may be displayed locally by the local display 152 and/or remotely by one or more remote displays 142. Thus, the frame buffer memory 217 is shared by the local keyboard/mouse/display system 105' or the local computer system 105 and the remote computer systems 104. While an entire frame of video/graphical data may be stored in the frame buffer memory 217, partitioned tiles of the frame having video/graphics data that has changed from the last frame of data may be transmitted by the chip 120 to the remote computer systems 104 while the entire frame of video/graphical data is provided to the local display 152. Note that a portion of the frame buffer memory 217 is also used as a scratch pad memory by the server management controller 310 for executing program instructions and for data storage.

The physical network interface device 202 may be mounted to the printed circuit board 201. Each of the one or more chips 120 may have a network bus 261 that is coupled to the physical network interface device 202 to couple data onto and receive data from the local or wide area network connection 205.

One or more of the remote computer systems 104 may be clients of the server 110 as well and connect through the wide area network connection 205' instead of or in addition to the wide area connection 205. In this case, the integrated management, graphics, input/output local/remote controller chip 120 may optionally couple to the network interface controller 213 via bus 264 so that the remote computer system 104 that is a client may also provide remote server management.

The client connection over the wide area network connection 205' to the server 110 for data processing is typically faster than the wide area network connection 205 for remote server management. Thus, it is desirable to reduce the amount of data transmitted over the wide area network connection 205 to provide a remote KVM capability for remote server management.

The integrated management, graphics, input/output local/remote controller chip 120 couples to a low pin count (LPC) host interface bus 252, one or more universal serial buses (USB1.1 and USB2.0) 253, one or more PCI buses (PCI/PCI Express) 254 of the server system 110 to transmit and receive ("transceive") data with the I/O controller 214. The integrated management, graphics, input/output local/remote controller chip 120 further couples to six serial inter-integrated circuit ($I^2C$) busses 256, five universal asynchronous receiver transmitter busses 257, analog voltage/temperature monitor lines 258, a general purpose input/output (GPIO) bus 259, and fan control/fan tachometer busses 260.

The integrated management, graphics, input/output local/remote controller chip 120 directly monitors the voltage of the system power 290 and the temperature of the server and perhaps the ambient temperature sensed by sensors by way of the analog voltage/temperature monitor lines 258. The integrated management, graphics, input/output local/remote controller chip 120 controls one or more server fans and monitors their fan speeds by means of the fan control/fan tachometer busses 260 in response to the server temperature and perhaps ambient temperature sensed by sensors. The integrated management, graphics, input/output local/remote controller chip 120 can monitor other server parameters by way of coupling to other sensors and circuits through the six serial inter-integrated circuit ($I^2C$) busses 256. A current sensor coupled to the chip 120 may be used to sense the current being provided by the power supply to the server to provide an indication of power consumption for example. An air flow sensor may also be coupled to the chip 120 to monitor the air flow through the server. A humidity sensor may also be coupled to the chip 120 to monitor the humidity of the surrounding air. A smoke detection sensor may also be coupled to the chip 120 to monitor the surroundings of the server for fire in order to protect the operation of and the data stored in the server.

The integrated management, graphics, input/output local/remote controller chip 120 provides an analog and/or digital video/graphics output to couple to the local display 152 by a video/graphics cable 263. The integrated management, graphics, input/output local/remote controller chip 120 further provides a serial interface, such as a universal serial bus, to couple to the local keyboard 154 and the local mouse 156 by one or more serial cables 262.

Referring now to FIGS. 1 and 2, the integrated management, graphics, input/output local/remote controller chip 120 generally provides integrated server management, graphics control for local and remote video, input/output control, and remote keyboard-mouse control. The integrated management, graphics, input/output local/remote controller chip 120 can provide local and remote server management (baseboard management control) in compliance with the intelligent platform management interface (IPMI) standard as well as other server management standards.

To provide remote keyboard-mouse control, the keystrokes on the remote keyboard 144 are sent to the integrated management, graphics, input/output local/remote controller chip 120 so that they take effect locally at one or more of the servers 110,112. The mouse movement and clicks at the remote mouse 146 are sent to the integrated management, graphics, input/output local/remote controller chip 120 so that they take effect locally at one or more of the servers 110,112.

The integrated management, graphics, input/output local/remote controller chip 120 further provides for remote storage. Data stored in the remote storage device 148 can be written to one or more of the servers 110,112. This allows the remote computer system to remotely install a software operating system or software drivers into the one or more servers 110,112 from the remote storage device. Alternatively, data stored in a local data storage device of the one or more servers may be read out and stored into the remote storage device at the remote computer system. For example, a log file stored in one or more of the servers may be stored in the remote data storage device 148 so that operation of a server may be monitored or debugged.

The integrated management, graphics, input/output local/remote controller chip 120 further provides integrated graphics control so that a single graphics controller can provide local video frames of data to the local monitor 152 and changes in the local video frames of data to one or more of the remote computer systems 104A-104N for display on the remote monitor 142. Oftentimes, only a small portion of a video frame changes from one frame to the next. By sending only the changes in the video frame to the remote computer system, the wide area connection between the server farm 102 and the one or more remote computer systems can be of lower quality slow speed connections, such as an Ethernet 10BASE-T connection or digital subscriber line (DSL) modem.

The integrated management, graphics, input/output local/remote controller chip 120 further provides for remote server management of each of the plurality of central processing unit servers 110A-110M and the plurality of storage servers 112A-112N. This is oftentimes referred to as server management, hardware management, baseboard management control, or intelligent platform management. The integrated management, graphics, input/output local/remote controller chip 120 provides an integrated server management controller (also referred to as an integrated baseboard management controller (BMC)) to monitor system sensors to control the server, such as the system temperature to control the system fans, and other events that may cause system failures. The integrated server management controller of the integrated management, graphics, input/output local/remote controller chip 120 also controls the server power supply to provide the ability to remotely shutdown/restart the system for whatever reason including maintenance or overnight power conservation, for example.

The integrated management, graphics, input/output local/remote controller chip 120 further provides for remote power supply control of each of the plurality of central processing unit servers 110A-110M and the plurality of storage servers 112A-112N. An information technology support person at one of the remote computer systems 104A-104N can remotely signal the integrated management, graphics, input/output local/remote controller chip 120 to switch off the power to one or more of the servers in the server farm 102, but for standby power. An information technology support person at one of the remote computer systems 104A-104N can also remotely signal the integrated management, graphics, input/output local/remote controller chip 120 to switch on the power to one or more of the servers in the server farm 102. This remote power off and on capability may be useful to reboot an operating system for whatever reason, such as for software upgrades.

Integrated Management, Graphics, Input/Output Local/Remote Controller Chip

Figure 3:
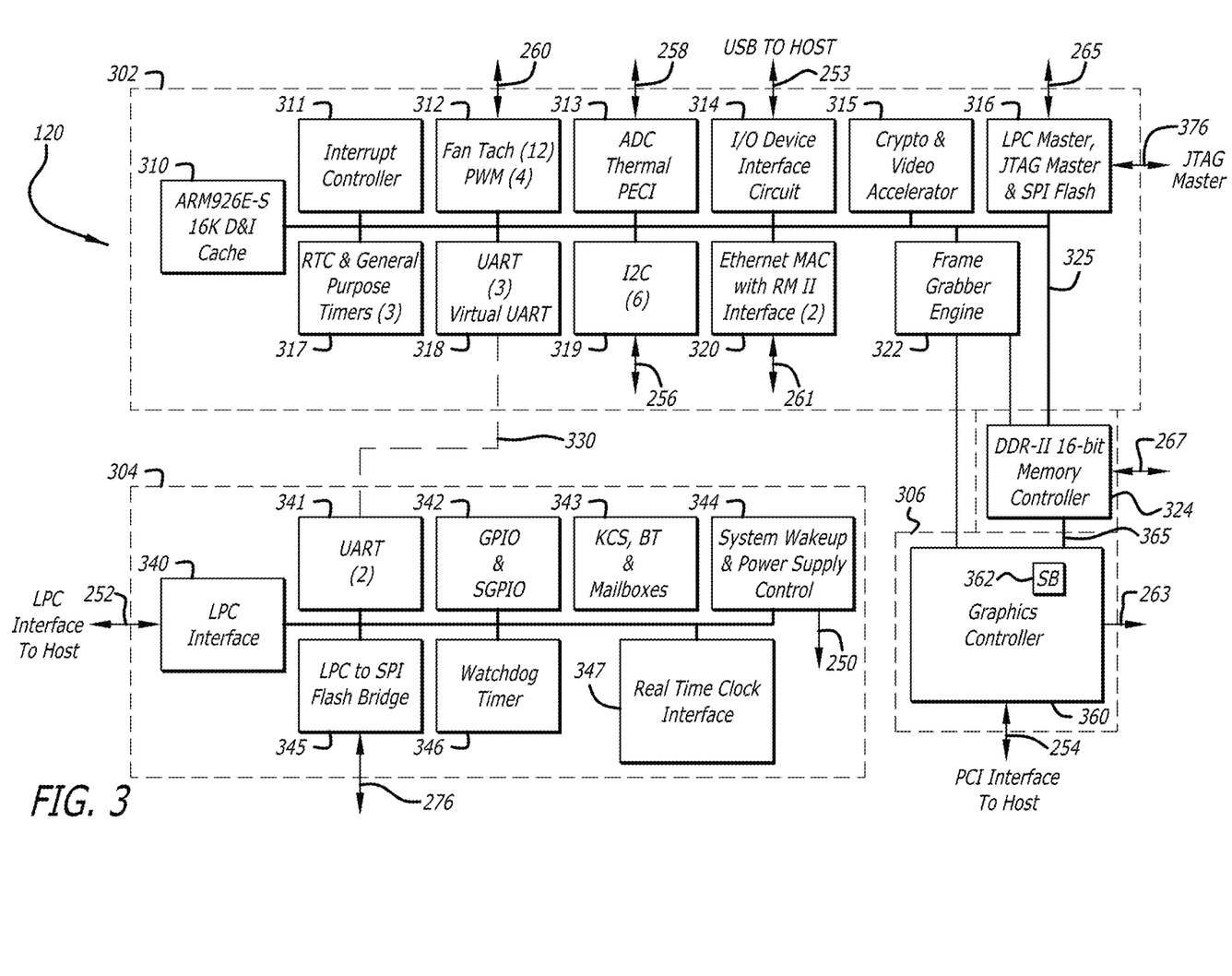
FIG. 3 is a block diagram of an integrated management, graphics, input/output remote controller chip in accordance with another embodiment of the invention.

Referring now to FIG. 3, a functional block diagram of the integrated management, graphics, input/output local/remote controller chip 120 is illustrated. The integrated management, graphics, input/output local/remote controller chip 120 is a single monolithic integrated circuit including functional blocks and subsystems in a single semiconductor substrate. That is, the integrated management, graphics, input/output local/remote controller chip 120 provides its functionality in a single chip solution.

The integrated management, graphics, input/output local/remote controller chip 120 includes a server management and remote KVM subsystem 302, a super input/output subsystem 304, and a graphics subsystem 306. The integrated management, graphics, input/output local/remote controller chip 120 includes a memory controller functional block 324 that is shared by the server management & remote KVM subsystem 302 as well as the graphics subsystem 306.

Referring now to FIG. 3 and FIG. 2, the memory controller 324 couples to the frame buffer memory 217 via a memory bus 267. In one embodiment of the invention, the memory 217 is type II DDR dynamic random access memory (DRAM) and the memory controller 324 is a sixteen bit type II DDR memory controller. The shared memory controller 324 allows for the frame buffer memory 217 to readily share its digital data in a digital pixel format with the one or more remote computer systems 104 and the local keyboard/mouse/display system 105' or the local computer system 105. In this manner, the frame buffer memory 217 is a unified memory that can provide support to multiple remote clients in a cost effective way.

The server management & remote KVM subsystem 302 further includes a server management controller 310, including a RISC processor core by Advanced Risc Machines Ltd. (ARM) and memory; an interrupt controller 311, an analog to digital converter 313 for voltage and temperature monitoring; an input/output device interface circuit 314 such as a universal serial bus (USB) interface circuit for USB1.1 and USB2.0; a cryptographer and video accelerator 315; a low pin count (LPC) master, a joint test action group (JTAG) test master, and flash memory serial peripheral interface (SPI) 316; real-time-clock (RTC) and general purpose timers 317; a plurality of universal asynchronous receive transmitters (UARTs) and a virtual UART 318; a plurality of inter-integrated circuit ("i-squared-c") interfaces 319; at least two Ethernet media access controllers 320 with a media independent interface (RMII) to couple to the physical (PHY) interface 202; and a frame grabber engine 322.

The server management controller 310 is a micro-controller that is programmed by its memory to provide baseboard management control. Thus, the server management controller 310 may also be referred to as a baseboard management controller. The server management controller 310 monitors the system temperature and controls the system fans. The server management controller 310 further monitors other events that may cause server system failures. The server management controller 310 further controls a system wakeup and power supply controller 344 to generate the power supply control signal 250 so that the server system can be substantially shutdown and restarted.

The frame grabber engine 322 couples to the memory controller 324 and the shared graphics controller 360 of the graphics subsystem 306. The frame grabber engine 322 may be used to partition a frame into tiles of data within the frame. The frame grabber engine 322 may be used to determine what tiles of a current frame have video/graphics data that has changed from the last frame. The identified changed tiles within a frame of data may then be compressed, packetized, and transmitted by the chip 120 to the remote computer systems 104 by way of the wide area network.

With a plurality of media access controllers 320, multiple clients at one or more remote computer systems 104 may connect simultaneously and view and manage one or more server systems 110 over a wide area network. Additionally, the Ethernet media access controllers 320 provide the remote connection for the remote computer systems 104 to the server management & remote KVM subsystem 302 and its elements. Key strokes and mouse movements/clicks are sent as packets from the remote computer system over the network to the Ethernet media access controller 320. The server management controller 310 processes these packets and presents key strokes and mouse movements/clicks to bus controller 314 and the host CPU via the USB interface 253 as though they were USB based keyboard/mouse commands. Remote storage devices 148 may also be presented by the bus controller 314 to the host CPU via the USB interface 253 as being USB based storage devices. The remote computer systems 104 can remotely install an operating system or drivers from the remote storage device 148 into the hard disk storage or any non-volatile storage 216 of the server by means of the Ethernet media access controller 320 and flash SPI interface 316. Additionally, the server management & remote KVM subsystem 302 and the media access controllers 320 allow a local audio stream on a universal serial bus from a microphone to be communicated to a remote client over the wide area network. Each of the media access controllers 320 may also be referred to as a network interface.

The super I/O subsystem 304 integrates together a number of communication interfaces of the server including a local USB keyboard and mouse interface for a local USB keyboard and USB mouse, and an RS232 communications interface via one or more universal asynchronous receiver transmitters for a local computer 105. The super I/O subsystem 304 provides a plurality of general purpose input/output ports and a bridge to the Basic Input/Output System (BIOS) stored in the flash memory 216. Moreover, the super I/O subsystem 304 provides an interface with the server management controller 310 of the server management & remote KVM subsystem 302. The super I/O subsystem 304 may also interface with the server management & remote KVM subsystem 302 to transparently send communications over a UART to a remote computer system 104 through the network media access controller 320 by way of the wide area network connection 261,205.

The super I/O subsystem 304 includes a low pin count (LPC) interface 340; a plurality of universal asynchronous receive transmitters (UARTs) 341; general purpose input/output (GPIO) and serial general purpose input/output (SGPIO) interfaces 342; keyboard style interface controller (KCS), block transfer (BT) & mailbox controller 342; a system wakeup and power supply controller 344; an LPC to flash memory serial peripheral interface (SPI) bridge 345 to couple to one or more SPI flash memory devices 216; a watchdog timer 346; and a real time clock (RTC) interface 347 coupled together as shown in FIG. 3. One of the UARTs 341 of the super I/O subsystem 304 may be selectively coupled to the virtual UART 318 of the BMC & KVMS subsystem 302 by means of a selective serial communication connection 330 so that the host system may communicate using a serial communication protocol with one of the remote computer systems 104.

The system wakeup and power supply controller 344 generates the power supply control signal 250 to provide the capability to remotely shutdown/restart the system.

As mentioned previously, the graphics subsystem 306 further includes the shared graphics controller 360 that is coupled to the memory controller 324 and the frame grabber engine 322. The graphics controller 360 further interfaces to the PCI/PCI express bus 254 to couple to the one or more host processors 141 and read and write into the memory 210 in order to obtain a frame of video/graphics data for display.

Generally, the graphics subsystem 306 provides the graphics controller 360 so that frames of video/graphical data may be displayed on the local monitor 152 via the video/graphics output 263. However when remote server management is taking place at a remote computer 104, it may be desirable to turn off the local display 152 for security reasons as well as to save memory bandwidth used by the graphics controller 360 for the local display. The graphics controller includes a security bit (SB) 362 that may be set by a support person at a remote computer system 104 over the wide area network connection 205. In response to the security bit 362, the graphics controller 360 turns off the video/graphics output 263 to the local display 152. Additionally, the graphics controller 360 avoids reading data from the frame buffer memory 217 such that data traffic on the bus 365 and bus 267 is reduced thereby conserving memory bandwidth and power.

Virtual Universal Asynchronous Receiver Transmitter for Remote Terminal Services It is desirable to provide remote terminal services at a remote computer to remotely manage and control a computer server. One or more selective serial communication connections 330 may be established between one of the plurality of UARTs 341 and one of the plurality UARTs 318 to provide the remote terminal services over a wide area network to manage server systems instead of or in addition to using remote KVM to manage server systems. The selective serial communication connection 330 is a low speed connection assuring that the remote connection over the network 205 will be of a low data rate using little bandwidth.

Figure 4:
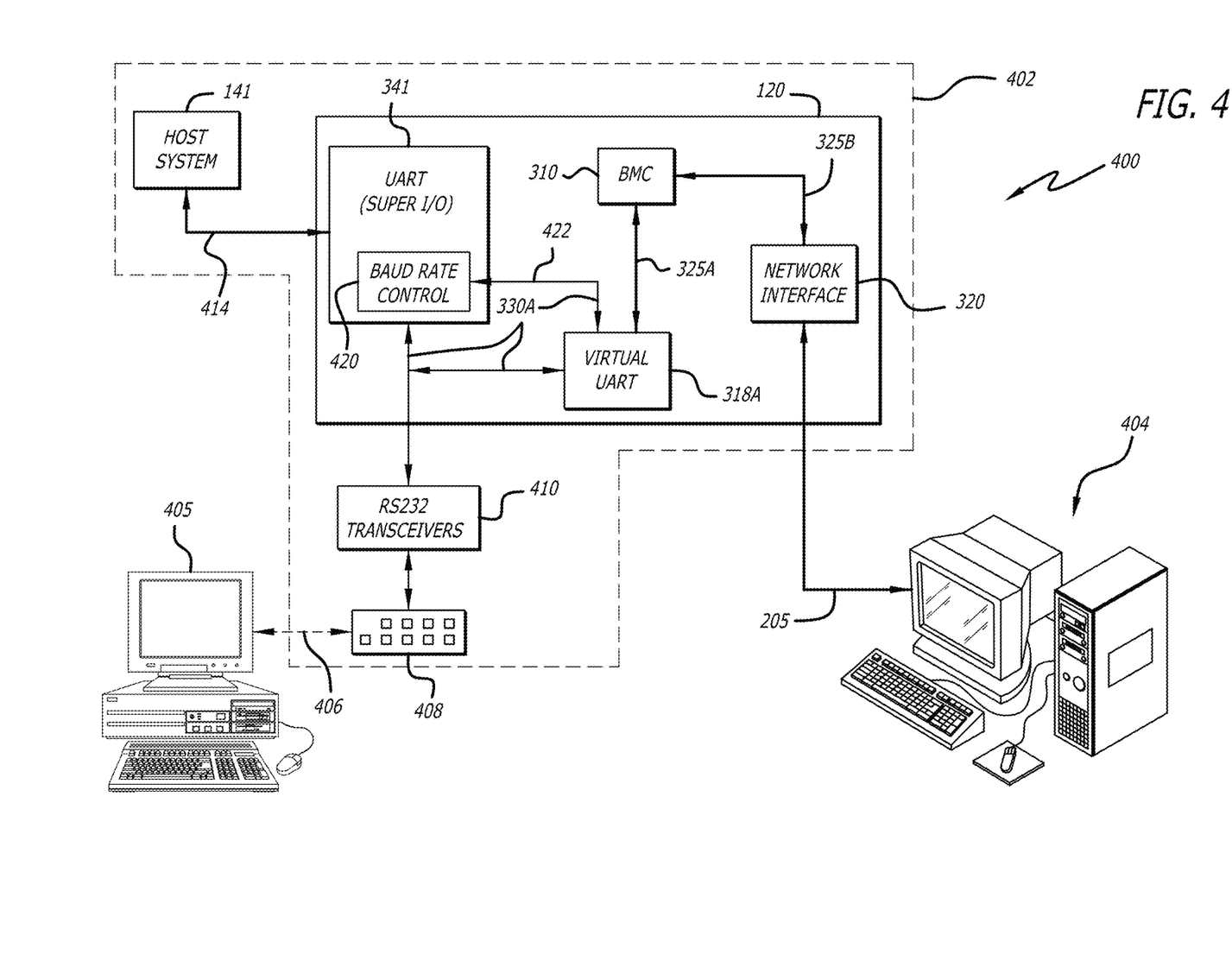
FIG. 4 is a block diagram of a local/remote server management system with a virtual UART connection to use a local computer terminal and a remote computer terminal for server management and control.

Referring now to FIG. 4, a block diagram of a local/remote server management system 400 with a virtual UART connection is illustrated. The system 400 includes a computer server 402 with an integrated management, graphics, input/output remote controller chip 120 coupled to a host system 141, and transceivers 410; and a remote computer terminal 404 coupled to the server by a local or wide area network 205. The server 402 further includes a COM or serial port connector 408 coupled to the transceivers 410 so that a local computer terminal 405 may optionally couple to the computer server 400 by means of a bidirectional serial communication cable 406 as a dumb terminal. The COM or serial port connector 408 may be shared by pairs of UARTs 341 and virtual UARTs 318A. Sharing the connector 408 in the server is advantageous to minimize the number of connectors in back and maintain a small form factor for a blade server. In one embodiment of the invention, the transceivers 410 are RS232 transceivers and the cable 406 is an RS232 cable. Messages regarding managing the server system 400 may be communicated between the host system 141 and the local computer terminal 405.

The integrated management, graphics, input/output remote controller chip 120 includes a UART 341, the virtual UART 318A, the server management controller 310, and a network interface controller 320 coupled together as shown to support local and remote terminal services. A bidirectional parallel data communication channel 414 via a parallel bus may be established between the host system or processor 141 and the UART 341. The selective serial communication connection 330A may be established between the UART 341 and the local computer terminal 405. Alternatively, the selective serial communication connection 330A may be established between the UART 341 and the virtual UART 318A to provide remote terminal services over a local or wide area network transparently to the remote computer terminal 404 without the host system 141 being aware of the remote connection. The transparency of the remote connection to the host system 141 is accomplished through hardware in the chip 120. Messages may be communicated between the host system 141 and the remote computer terminal 404 to remotely monitor, manage, and control the server system 400.

In any case, the host system or processor 141 sets the baud rate by storing timing information in one or more baud rate control registers 420 of the UART 341 and the virtual UART 318A automatically synchronizes its serial data communication rate to that of the UART 341. Other bits in the one or more baud rate control registers 420 may also be used for other control settings of the selective serial communication connection 330A. Control logic in each of the UARTs 341 and 318A are responsive to the baud rate and other control signals to establish the selective serial communication connection 330A.

The remote computer terminal 404 may execute software (e.g., Telnet client) to simulate or emulate a COM or serial port to receive the serial data at the remote location over the network connection 205. Alternatively, the chip 120 provides a web browser interface that can simulate or emulate the COM or serial port in the chip and display the information in the serial data remotely to the remote computer terminal 404 via a web browser. A secure communication channel over the network 205 may also be established between the chip 120 and the remote computer 404 so that information is not misappropriated.

The UART 341 includes a baud rate control register 420 that has its contents shared with the virtual UART 318A so that it knows the rate of serial communication that the UART 341 is expecting over the selective serial communication connection 330A. The host system 141 may change the baud rate stored in the baud rate control register 420 to increase or decrease the serial communication rate on the fly. The virtual UART 318A tracks the timing changes made at the UART 341 for the selective serial communication connection 330A. The virtual UART 318A may automatically monitor or snoop the serial communication connection 330A for a command in the serial data sequence to change the baud rate. Alternatively, the virtual UART 318A may automatically monitor the baud rate control register 420 via one or more data lines or bus 422 for register data changes or a clocking of the register 420 to detect a change in baud rate. Alternatively, the information stored in the register 420 may be simply shared by UART 341 with the virtual UART 318A via the one or more data lines or bus 422 as they are both in the same integrated circuit chip.

While data is communicated serially in two directions between the UART 341 and virtual UART 318A or the UART 341 and the local computer terminal 405, the bidirectional communication between the UART 341 and the host system 141 is in parallel over the bidirectional parallel data communication channel or parallel bus 414. Similarly, the bidirectional communication between the virtual UART 318A and the server management controller 310 and the bidirectional communication between the server management controller 310 and the network interface controller 320 is in parallel over the respective busses 325A and 325B. Each of the UART 341 and the virtual UART 318A include a serializer to convert parallel data into serial data on the selective serial communication connection 330A in response to the baud rate. Each of the UART 341 and the virtual UART 318A further include a deserializer to convert serial data on the selective serial communication connection 330A into parallel data in response to the baud rate. The information on the selective serial communication connection 330A from the host system is eventually packetized in accordance with the network protocol, such as into an ASCII data packet for example, for communication over the network 205 to the remote computer terminal 404. Information on the network 205 is de-packetized prior being communicated over the selective serial communication connection 330A to the host system 141. In contrast, the serial information on the selective serial communication connection 330A for the local computer terminal 405 need not be packetized or de-packetized.

The virtual UART 318A captures the data from the COM port of the host system and pipes the data to the server management controller 310 of the server management & KVMS subsystem 302 illustrated in FIG. 3. The server management controller 310 takes the captured data and sends it over the local or wide area network through the network interface 320. Data from the remote computer terminal 404 for the host system 141 takes the reverse path over the network 205 through the network interface 320, over the bus 325B to the server management controller 310, to the virtual UART over the bus 325A, and to the UART 341 over the serial communication link 330A. However, the remote computer terminal may choose to communicate with the server management controller 310 using remote terminal services and not the host system 141. In which case data or commands from the remote computer terminal 404 for the server management controller 310 are communicated over the network 205 and propagate through the network interface 320 and over the bus 325B to the server management controller 310 and visa-versa.

Figure 5A:
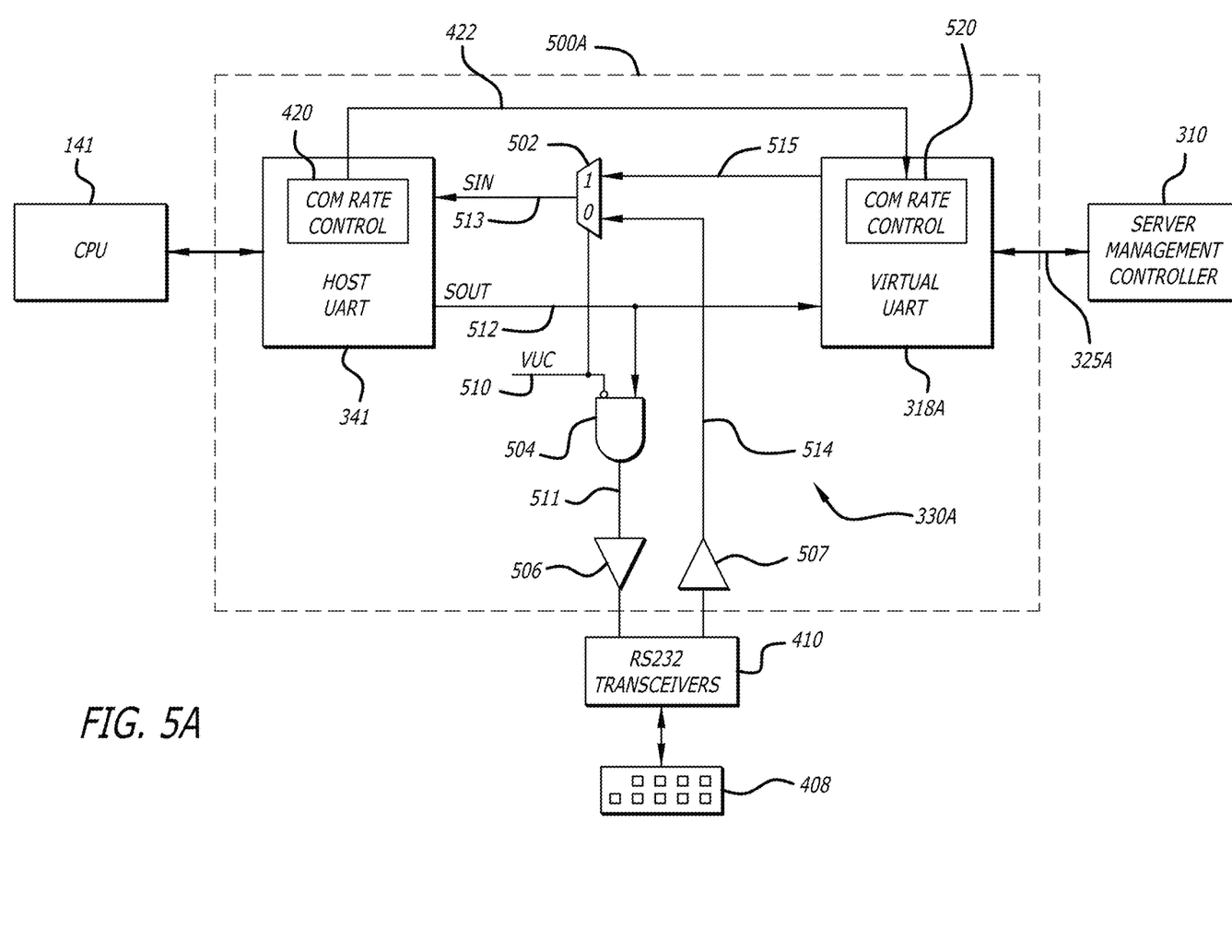
FIG. 5A is a block diagram of control circuitry and connections between the host UART, the virtual UART, and the communication port of the server in accordance with one embodiment of the invention.

Referring now to FIG. 5A, a detailed block diagram of selective serial connection circuitry 500A between the UART 341, the virtual UART 318A, and the communication port 408 of the server 402 is illustrated. The selective serial connection circuitry 500A establishes the selective serial communication connection 330A between the UART 341 and the local computer terminal 405 or between the UART 341 and the virtual UART 318A.

The selective serial connection circuitry 500A includes a two bit multiplexer 502 having an output coupled to the serial input SIN 513 of the UART 341, an input I0 coupled to a local serial input (LSIN) 514 of a serial communication port 408 through a buffer 507 and an RS232 receiver 410, an input I1 coupled to a remote serial input (RSIN) 515 from the serial output of the virtual UART 318A, and a select input coupled to a virtual UART control (VUC) signal 510. The virtual UART control (VUC) signal 510 selectively couples the serial interfaces of the UART 341 and the virtual UART together to provide remote terminal services at the remote computer system over a local or wide area network. Alternatively, the virtual UART control (VUC) signal 510 selectively couples the serial interface of the UART 341 to the RS232 transceivers 410 and the COM port connector 408 to provide local terminal services at a local computer system.

The virtual UART control (VUC) signal 510 may be generated in response to a request from the remote computer terminal 404. Alternatively, the virtual UART control (VUC) signal 510 may be generated by commands sent over the selective serial communication connection 330A, such as by the host system 414. Alternatively, the virtual UART control (VUC) signal 510 may be generated to toggle between communication with the local terminal 405 and communication with the remote terminal. For example, the host system may designate certain messages to be serially communicated to the local terminal 405 only and certain other messages be serially communicated to the remote computer terminal 404 only. In which case, the serial communication connection 330A may be monitored or snooped by control logic for commands in the serial data sequence to generate the virtual UART control signal 510.

Figure 5B:
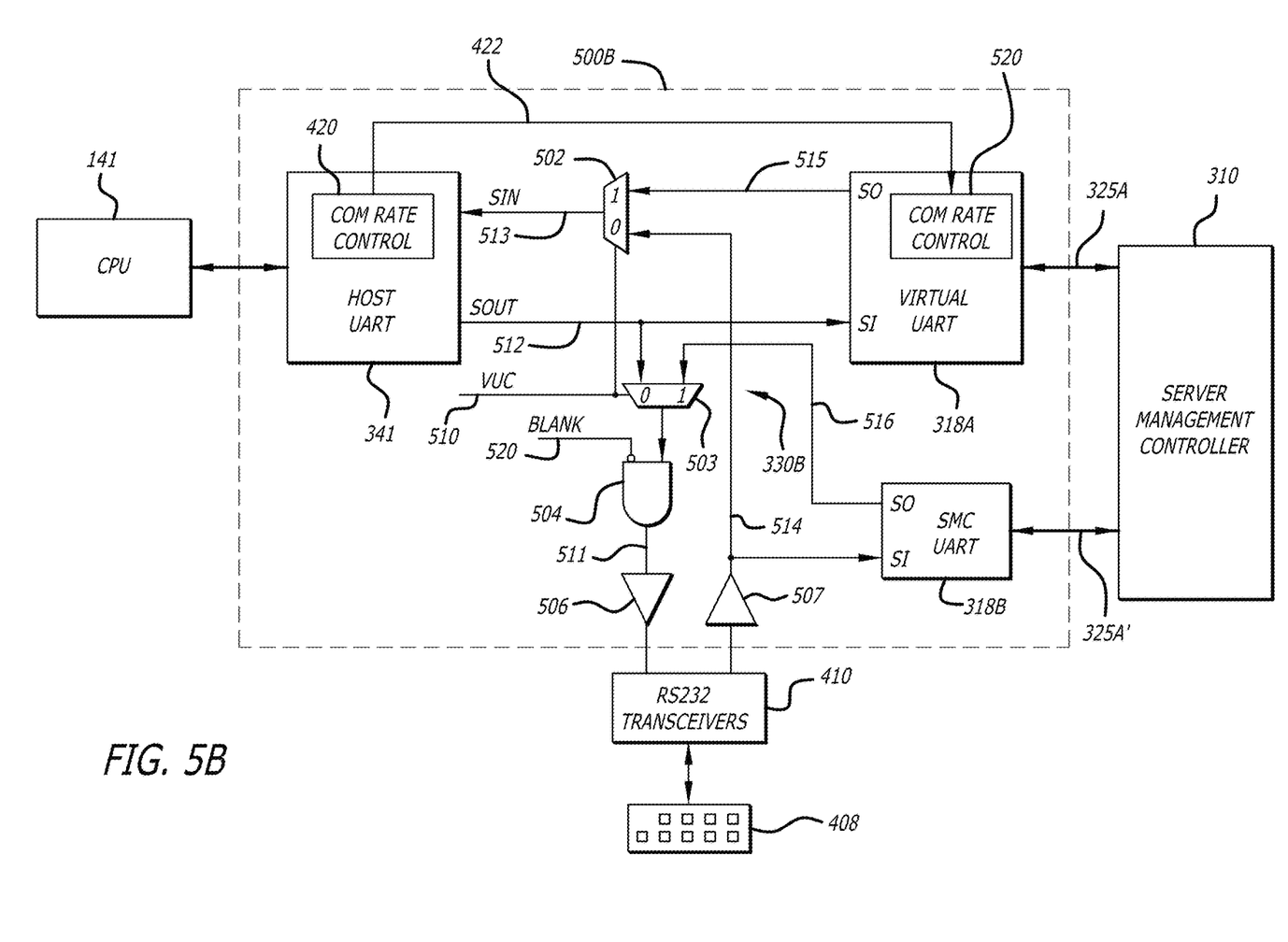
FIG. 5B is a block diagram of control circuitry and connections between the host UART, the virtual UART, the SMC UART, and the communication port of the server in accordance with another embodiment of the invention.

Referring now to FIG. 5B, a detailed block diagram of selective serial connection circuitry 500B between the host UART 341, the virtual UART 318A, the SMC UART 318B and the communication port 408 of the server 402 is illustrated. The selective serial connection circuitry 500B establishes a selective serial communication connection 330B for (i) the host/local computer terminal with no connection to the SMC 310 or (ii) connections for the host/virtual UART and the local computer terminal/SMC UART. That is with the appropriate control signals, the selective serial connection circuitry 500B may allow for the local computer terminal 405 to directly communicate with the SMC 310 over bus 325A' while the host 141 may coincidentally communicate with the SMC 310 over bus 325A. From the same serial communication port 408, the selective serial connection circuitry 500B allows the local computer terminal to communicate with the host 141 or to directly communicate with the server management controller 301 over a serial communication connection in response to a control signal.

The selective serial connection circuitry 500B is similar to the selective serial connection circuitry 500A but has a few extra elements and connections, and a change in gating control to the gating logic 504. The selective serial connection circuitry 500B further includes a two bit multiplexer 503 coupled between the serial output ports of the host UART 341, SMC UART 318B and an input to the gating logic 504. Instead of the VUC signal 510, a blank control signal 520 is used to provide the gating control of the gating logic 504. The local serial input (LSIN) 514 of the serial communication port 408 is coupled to an input I0 of the multiplexer 502 and a serial input port (SI) of the UART 318B. The two bit multiplexer 503 has an output coupled to an input of the gating logic 504, an input I0 coupled to the serial output port (SO) 512 of the host UART 341, an input I1 coupled to the serial output port (SO) 516 of the SMC UART 318B, and a select input coupled to the virtual UART control (VUC) signal 510.

The virtual UART control (VUC) signal 510 selectively couples the serial interfaces of the UART 341 and the virtual UART 318A together to provide remote terminal services at the remote computer system over a local or wide area network and couples the serial interface of the UART 318B to the RS232 transceivers 410 and the COM port connector 408 to allow the local computer system to directly access the server manager controller 310. Alternatively, the virtual UART control (VUC) signal 510 selectively couples the serial interface of the UART 341 to the RS232 transceivers 410 and the COM port connector 408 to provide local terminal services at a local computer system.

Figure 7A:
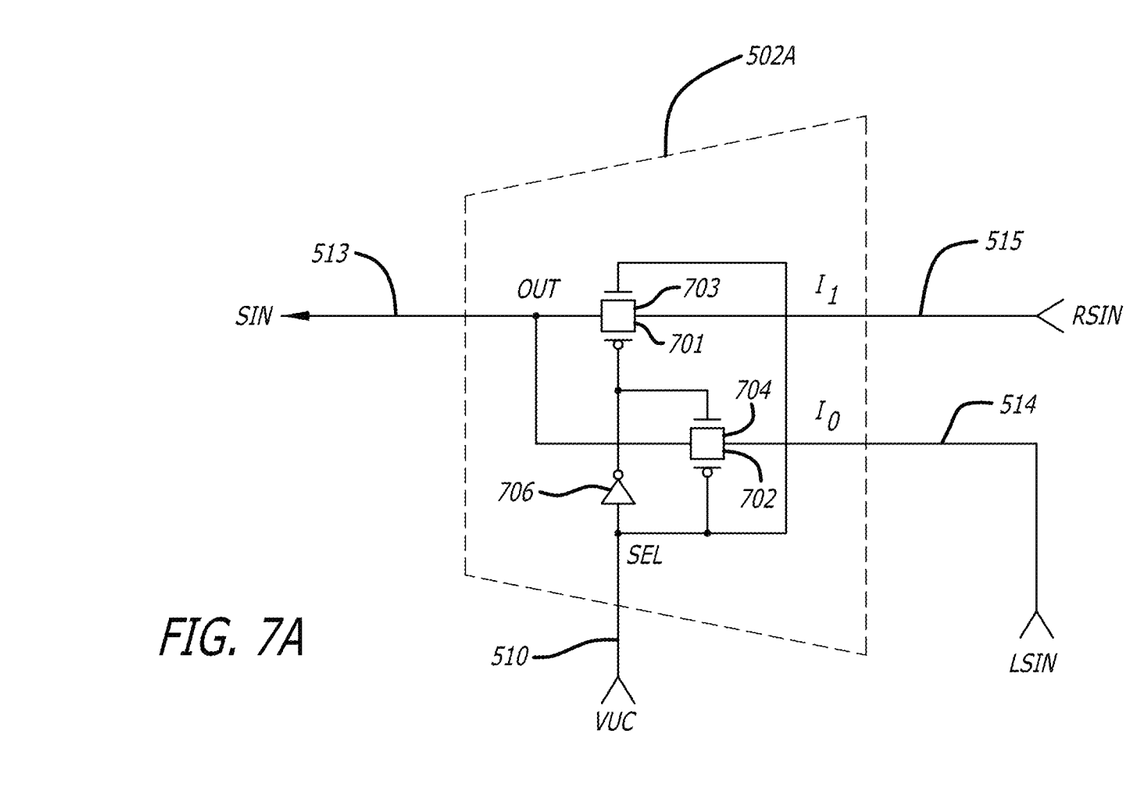
FIGS. 7A-7C are schematic diagrams of exemplary two-bit multiplexers to multiplex the local serial input and the remote serial input into the serial input of the UART coupled to the host system.

Referring now to FIG. 7A, a schematic diagram of a two bit multiplexer 502A is illustrated that may be used as the multiplexers 502,503 in the selective serial connection circuitry 500A-500B. The two bit multiplexer 502A includes an inverter 706, a first transfer gate coupled between the serial input SIN 513 and the serial output RSIN 515 of the virtual UART, and a second transfer gate coupled between the serial input SIN 513 and the serial input LSIN 514 of the serial communication port. The inverter 706 is coupled to the virtual UART control (VUC) signal to generate an inverted virtual UART control signal. The first transfer gate is responsive to the virtual UART control signal and the second transfer gate responsive to the inverted virtual UART control signal.

The first transfer gate includes a p-channel field effect transistor (PFET) 701 and an n-channel field effect transistor (NFET) 703 coupled in parallel together with sources and drains respectively coupled together. The second transfer gate includes a p-channel field effect transistor (PFET) 702 and an n-channel field effect transistor (NFET) 704 coupled in parallel together with sources and drains respectively coupled together. The gates of the PFET 701 of the first transfer gate and the NFET 704 of the second transfer gate are coupled together to the output of the inverter 706 to receive the inverted virtual UART control signal. The gates of the NFET 703 of the first transfer gate and the PFET 702 of the second transfer gate are coupled together to the virtual UART control (VUC) signal 510.

Figure 7B:
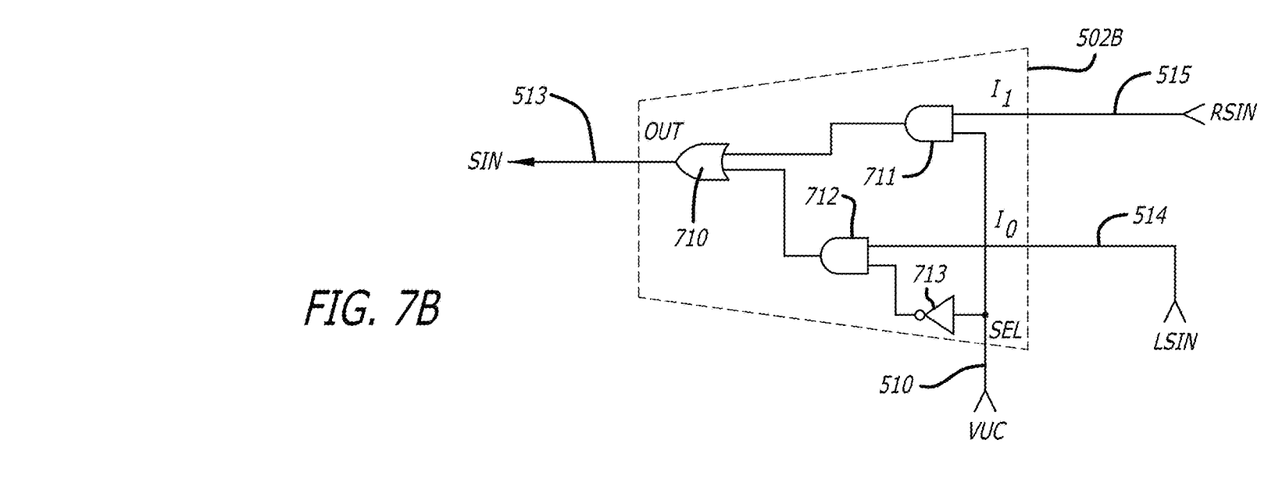

Referring now to FIG. 7B, a schematic diagram of a two bit multiplexer 502B is illustrated that may be used as the multiplexers 502,503 in the selective serial connection circuitry 500A-500B. The multiplexer 502B includes an OR gate 710, AND gates 711-712, and an inverter 713 coupled together as shown. An input of the inverter 713 is coupled to the virtual UART control signal to generate an inverted virtual UART control signal. The AND gate 712 has a first input coupled to an output of the inverter 713 to receive the inverted virtual UART control signal. The AND gate 712 has a second input coupled to the serial input of the serial communication port. The AND gate 711 has a first input coupled to the virtual UART control signal 510 and a second input coupled to the serial output RSIN 515 of the second UART. The OR gate 710 has a first input coupled to the output of the AND gate 711 and a second input coupled to the output of the AND gate 712. The OR gate 710 generates a multiplexed output signal at its output and output of the multiplexer 502B that is coupled to the serial input of SIN 513 of the UART 341.

Figure 7C:
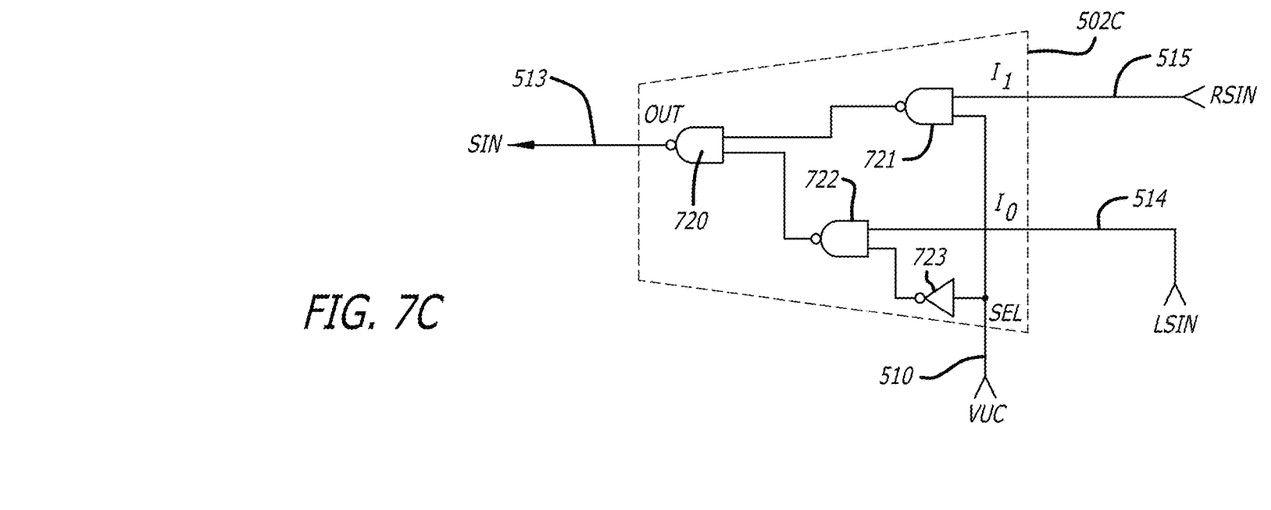

Referring now to FIG. 7C, a schematic diagram of a two bit multiplexer 502C is illustrated that may be used as the multiplexers 502,503 in the selective serial connection circuitry 500A-500B. The multiplexer 502C includes NAND gates 720-722, and an inverter 723 coupled together as shown. An input of the inverter 723 is coupled to the virtual UART control signal to generate an inverted virtual UART control signal. The NAND gate 722 has a first input coupled to an output of the inverter 723 to receive the inverted virtual UART control signal. The NAND gate 722 has a second input coupled to the serial input of the serial communication port. The NAND gate 721 has a first input coupled to the virtual UART control signal 510 and a second input coupled to the serial output RSIN 515 of the second UART. The NAND gate 720 has a first input coupled to the output of the NAND gate 721 and a second input coupled to the output of the NAND gate 722. The NAND gate 720 generates a multiplexed output signal at its output and output of the multiplexer 502C that is coupled to the serial input of SIN 513 of the UART 341.

Referring now back to FIGS. 5A-5B, the selective serial connection circuitry 500A-500B may further include gating logic coupled between the UART 341 and the serial communication port 408 to gate the serial output of the UART 341 from the serial output of the serial communication port to protect data by avoiding the display of data on a local monitor. In FIG. 5A, the gating logic 504 has a first input coupled to the serial output (SOUT) 512 of the UART 341, a second input coupled to the virtual UART control (VUC) signal 510, and an output coupled to the serial output of the serial communication port 408 through a buffer 506 and an RS232 transmitter 410. The gating logic 504 gates the serial output of the UART 341 from the serial output of the serial communication port 408 in response to the virtual UART control (VUC) signal 510. In one embodiment of the invention, the gating logic 504 gates the serial output of the UART 341 from the serial output of the serial communication port 408 in response to the virtual UART control (VUC) signal 510 being logically high. In FIG. 5B, the gating logic 504 has a first input coupled to the output of the multiplexer 503, a second input coupled to the virtual UART control (VUC) signal 510, and an output 511 coupled to the serial output of the serial communication port 408 through a buffer 506 and an RS232 transmitter 410. The gating logic 504 gates the serial output of the multiplexer 503 from the serial output of the serial communication port 408 in response to a blank control signal 520.

Figure 6A:
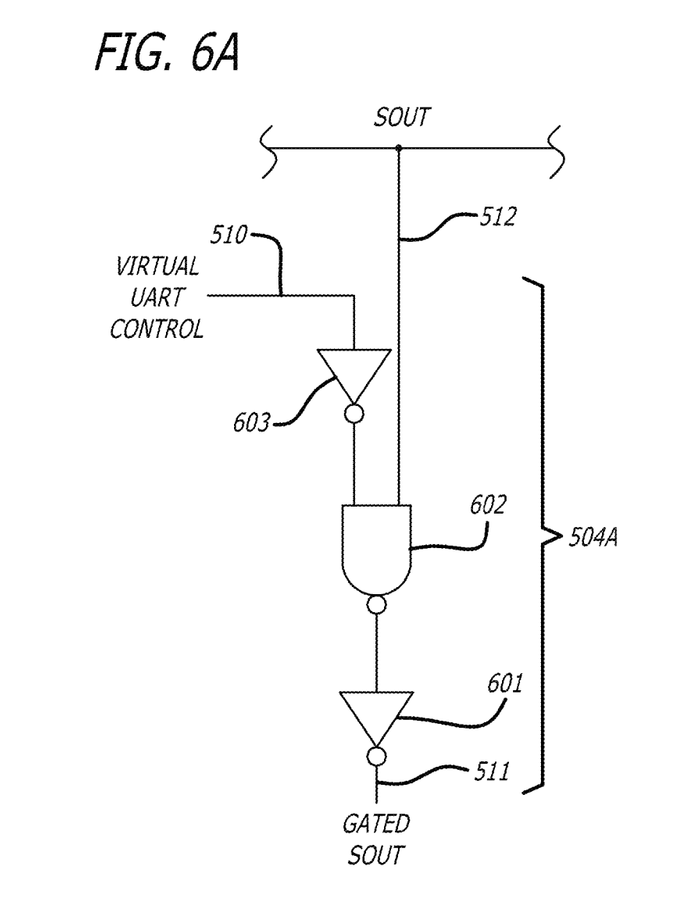
FIGS. 6A-6B are schematic diagrams of exemplary gating logic to gate the serial output to the serial communication port of the server.

Referring now to FIG. 6A, a schematic diagram of gating logic 504A is illustrated that may be used as the gating logic 504 in the selective serial connection circuitry 500A-500B. The gating logic 504A includes a first inverter 601, a NAND gate 602, and a second inverter 603 coupled together as shown. The inverter 601 is coupled to the virtual UART control signal 510 to generate an inverted virtual UART control signal. The NAND gate 602 has a first input coupled to the output of the inverter 601 to receive the inverted virtual UART control signal and a second input coupled to the serial output (SOUT) 512 of the UART 341. The second inverter is coupled to the output of the NAND gate 602 to generate the gated serial output 511 that is coupled to the buffer 506. The gating logic 504A gates the serial output of the UART 341 from the serial output of the serial communication port 408 in response to the virtual UART control (VUC) signal 510 being logically high. If the gating logic 504A is to gate the serial output of the UART 341 from the serial output of the serial communication port 408 in response to the virtual UART control (VUC) signal 510 being logically low, the inverter 603 may be eliminated in an alternate embodiment of the invention.

Figure 6B:
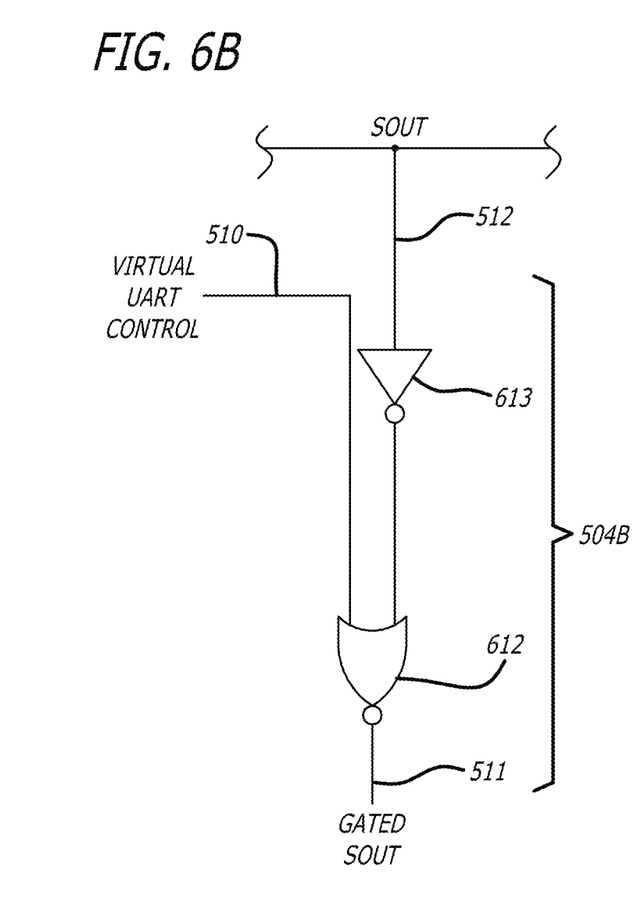

Referring now to FIG. 6B, a schematic diagram of gating logic 504B is illustrated that may be used as the gating logic 504 in the selective serial connection circuitry 500A-500B. The gating logic 504B includes a first inverter 613, and a NOR gate 612 coupled together as shown. The NOR gate 612 has a first input coupled to the output of the inverter 613 to receive the inverted serial output. A second input of the NOR gate 612 is coupled to virtual UART control (VUC) signal. The output of the NOR gate 612 generates the gated serial output 511. The gating logic 504B gates the serial output of the UART 341 from the serial output of the serial communication port 408 in response to the virtual UART control (VUC) signal 510 being logically high. If the gating logic 504B is to gate the serial output of the UART 341 from the serial output of the serial communication port 408 in response to the virtual UART control (VUC) signal 510 being logically low, an inverter may be readily added to invert the control signal in an alternate embodiment of the invention.

Referring now back to FIGS. 5A-5B, the virtual UART 318A is substantially similar to the UART 341 but for how the baud rate is set for serial data communication over the selective serial communication connection 330A. The UART 341 and the virtual UART 318A may each have a communications rate control register 420 and 520 respectively to store the baud rate settings. The virtual UART 318A monitors the communication rate control register 420 for changes and automatically updates its communication rate control register 520 in response to a change in the baud rate stored in the communication rate control register 420. In an alternate embodiment of the invention, the virtual UART 318A may simply continuously read the baud rate out of the communications rate control register 420 and buffer it for use in the virtual UART 318A. In yet another embodiment of the invention, the virtual UART 318A may automatically snoop the serial data output 512 from the UART 341 and listen for and decode a command to change the baud rate and then capture the new baud rate from the serial data output 512 and store it in the communication rate controller 520. In any case, the virtual UART 318A automatically changes its serial data communications rate in response to the new baud rate that is stored in the communications rate controller 420 of the UART 341 by the processor or host system 141.

In FIG. 5B, the SMC UART 318B is substantially similar to the UART 341. However, the serial data communication rate of the SMC UART 318B is set by the local computer terminal 405 and not the host 141.

The universal asynchronous receiver transmitter (UART) 341 has a parallel input/output interface to couple to the host system to receive and transmit parallel data. The universal asynchronous receiver transmitter (UART) 341 further has a serial input/output interface coupled to the selective serial connection circuitry 500A-500B. The UART 341 converts parallel input data at its parallel port into serial output data on its serial output. The UART 341 further converts serial input data at its serial input into parallel output data on its parallel output.

The virtual UART 318A also has a parallel input/output interface and a serial input/output interface coupled to the selective serial connection circuitry 500A-500B as the case may be. In FIGS. 5A-5B, a serial input of the virtual UART 318A is coupled to the serial output (SOUT) 512 of the UART 341. The serial output 515 of the virtual UART 318A is selectively coupled to the serial input (SIN) 513 of the UART 341 through the multiplexer 502. The virtual UART 318A converts parallel input data at its parallel port into serial output data on its serial output. The virtual UART 318A further converts serial input data at its serial input into parallel output data on its parallel output.

The UART 318B also has a parallel input/output interface and a serial input/output interface coupled to the selective serial connection circuitry 500B. In FIG. 5B, a serial input of the UART 318B is coupled to the local serial input (LSIN) 514 of the serial communication port 408. The serial output 516 of the UART 318B is selectively coupled to the local serial output (LSOUT) 511 of the serial communication port 408 through the multiplexer 503 in response to the host-virtual UART control (VUC) signal 510. Alternatively, the serial output 512 of the UART 341 is selectively coupled to the local serial output (LSOUT) 511 of the serial communication port 408 through the multiplexer 503 in response to the VUC signal 510. Additionally, the UART 318B converts parallel input data at its parallel port into serial output data on its serial output port. The UART 318B further converts serial input data at its serial input port into parallel output data on its parallel output port.

CONCLUSION

One or more elements of the embodiments of the invention may be implemented in software. When implemented in software, the elements of the embodiments of the invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. Rather, the embodiments of the invention should be construed according to the claims that follow below.

What is claimed is:

1. A method of providing remote terminal services over a network, the method comprising:
in a monolithic integrated circuit,
selectively decoupling a serial input of a serial communication port of a server from a serial input of a first universal asynchronous receiver transmitter (UART);
selectively coupling the serial input of the first UART to the serial output of a second UART to provide remote terminal services at a remote computer system over a network;
synchronizing a serial data communication rate of the second UART to a serial data communication rate of the first UART; and
serially communicating data between the first UART and the second UART in response to the synchronized serial data communication rate.

2. The method of claim 1, wherein
a serial output of the first UART is coupled to a serial input of the second UART.

3. The method of claim 2, wherein
the serial output of the first UART is coupled to the serial output of the serial communication port.

4. The method of claim 2, further comprising:
in the monolithic integrated circuit,
gating a serial output of the first UART from the serial output of the serial communication port to protect data by avoiding the display of data on a local monitor.

5. The method of claim 2, further comprising:
in the monolithic integrated circuit,
selectively coupling a serial output of a third universal asynchronous receiver transmitter (UART) into a serial output of the serial communication port to provide direct access to a server management controller by a local computer system,
wherein the serial input of the serial communication port is coupled to the serial input of the third UART.

6. The method of claim 5, further comprising:
communicating data in parallel between one or more host processors and the first UART.

7. The method of claim 6, further comprising:
communicating data in parallel between a server management controller and the second UART; and
communicating data in parallel between the server management controller and the third UART.

8. The method of claim 2, further comprising:
communicating data in parallel between one or more host processors and the first UART.

9. The method of claim 8, further comprising:
communicating data in parallel between a server management controller and the second UART to provide the remote terminal services at the remote computer system over the network.

10. A system with local and remote server management comprising:
a server having a printed circuit board with
a network interface controller to couple the server to a network for remote client access and remote management and control of the server,
a serial communication port to couple to a local computer system for local management and control of the server, and
an integrated intelligent server management chip coupled to the network interface controller, the integrated intelligent server management chip to provide local and remote management and control of the server, the integrated intelligent server management chip including a first universal asynchronous receiver transmitter (UART) to couple to a host, a second virtual UART to couple to a remote computer system, a serial input/output interface to couple to the serial communication port, and a selective serial communication connection coupled between the first UART, the second virtual UART, and the serial input/output interface;

a remote computer system coupled to the network interface controller through a local or wide area network, the remote computer system including a remote display, a remote keyboard, and a remote mouse to remotely manage and control the server; and a local computer system coupled to the serial communication port of the server, the local computer system including a local display, a local keyboard, and a local mouse to locally manage and control the server.

11. The system of claim 10, wherein
the integrated intelligent server management chip further includes a server management controller to provide baseboard management control of the server; and a network media access controller coupled to the server management controller, the network media access controller to couple the server to the network for remote management and control of the server.

12. The system of claim 10, wherein
the selective serial communication connection includes
a multiplexer to selectively multiplex a remote serial input from the second virtual UART and a local serial input from the serial communication port.

13. The system of claim 12, wherein
the selective serial communication connection further includes
gating logic to gate a serial output of the first UART into the serial communication port, the gating logic responsive to a virtual UART control signal.

14. The system of claim 10, wherein
the second virtual UART automatically synchronizes its serial data communication rate to the serial data communication rate of the first UART.

* * * * *